(12) United States Patent
Rivera

(10) Patent No.: US 7,963,098 B2
(45) Date of Patent: Jun. 21, 2011

(54) COMPOSITE DUCT ASSEMBLY

(75) Inventor: Anthony Rivera, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1043 days.

(21) Appl. No.: 11/761,489

(22) Filed: Jun. 12, 2007

(65) Prior Publication Data

US 2008/0308048 A1 Dec. 18, 2008

(51) Int. Cl.
*F02K 3/02* (2006.01)
(52) U.S. Cl. ...................................... 60/226.1
(58) Field of Classification Search .................. 60/226.1; 138/109, 120, 155, 163; 285/65, 70, 298, 285/330, 913
See application file for complete search history.

(56) References Cited

U.S. PATENT DOCUMENTS

| | | | |
|---|---|---|---|
| 3,771,820 A * | 11/1973 | Hoss et al. ................ | 285/373 |
| 4,005,822 A | 2/1977 | Timms | |
| 4,425,080 A * | 1/1984 | Stanton et al. ............. | 415/197 |
| 4,865,267 A | 9/1989 | Severson | |
| 5,795,383 A * | 8/1998 | Okamoto et al. ........... | 117/30 |
| 6,439,840 B1 | 8/2002 | Tse | |
| 6,532,731 B2 | 3/2003 | Springer | |
| 6,554,564 B1 | 4/2003 | Lord | |
| 6,732,502 B2 | 5/2004 | Seda et al. | |
| 6,901,739 B2 | 6/2005 | Christopherson | |
| 6,968,674 B2 | 11/2005 | Wollenweber | |
| 7,055,306 B2 | 6/2006 | Jones et al. | |
| 7,119,275 B2 * | 10/2006 | Suzuki et al. ............... | 174/503 |
| 7,140,174 B2 | 11/2006 | Johnson | |
| 2004/0012198 A1 * | 1/2004 | Brotzell et al. .............. | 285/249 |
| 2005/0229558 A1 * | 10/2005 | Stelzer et al. ............... | 55/385.3 |
| 2007/0107832 A1 * | 5/2007 | Frantz et al. ................ | 156/217 |
| 2007/0151214 A1 * | 7/2007 | Stelzer et al. ............... | 55/306 |
| 2008/0001396 A1 * | 1/2008 | Nish et al. .................. | 285/53 |
| 2008/0115454 A1 * | 5/2008 | Xie ............................. | 52/783.1 |
| 2008/0217056 A1 * | 9/2008 | Howard ....................... | 174/88 S |

* cited by examiner

*Primary Examiner* — Michael Cuff
*Assistant Examiner* — Phutthiwat Wongwian
(74) *Attorney, Agent, or Firm* — Carlson, Gaskey & Olds PC

(57) ABSTRACT

A carbon composite duct assembly has a duct body having an opening. The duct body extends along an axis. The opening extends transversely to the axis. The duct body has a carbon composite fabric layer. The duct body has an axial flange extending along the axis and a peripheral flange extending along the opening. The axial flange and the peripheral flange overlap forming a corner of the carbon composite fabric layer.

13 Claims, 6 Drawing Sheets

COMPOSITE DUCT ASSEMBLY

This invention was made with government support under Contract No. n00019-02-c-3003, awarded by the Department of the Navy.

BACKGROUND OF THE INVENTION

This invention relates to an assembly and method of manufacturing a carbon composite duct assembly, such as for a turbine engine.

A turbine engine may have a bypass duct assembly. The bypass duct assembly provides a source of thrust for the engine and generally surrounds the engine core. The assembly comprises several ducts: an intermediate case duct, a split flange duct and a forward augmenter duct. The intermediate case duct is upstream of the split flange duct, which is followed downstream by the forward augmenter duct.

To provide access to the engine core, the split flange duct is made of two halves split generally along the length of the duct. Each half interfaces with the other half through a flange, an axial flange, extending along the length of the duct. In addition, the split flange duct interfaces with the intermediate case duct and the forward augmenter duct through circumferential flanges that surround the opening of the split flange duct on each side. For each half of the split flange duct, the axial flange and the circumferential flange intersect, forming a corner.

Bypass ducts have typically been made of metal. Recently, carbon fiber has become an alternative source of material for the parts of the turbine engine. One problem presented by the use of carbon fiber has been to attempt to create the corner formed by the circumferential flange and the axial flange. For metal ducts, the corner is either welded, forged or machined. With respect to carbon fiber, however, these techniques are not available for forming a corner.

A need exists for a way to create a corner at the intersection of the axial flange and the circumferential flange of a carbon composite duct.

SUMMARY OF THE INVENTION

A carbon composite duct assembly, such as a split flange duct, has a duct body with an opening. The duct body extends along an axis. The opening extends across the axis. The duct body has a carbon composite fabric layer. The duct body has an axial flange extending along the axis and a peripheral flange extending along the opening. The axial flange and the peripheral flange overlap forming a corner of the carbon composite fabric layer.

The various features and advantages of this invention will become apparent to those skilled in the art from the following detailed description. The drawings that accompany the detailed description can be briefly described as follows.

DETAILED DESCRIPTION

Figure 1:
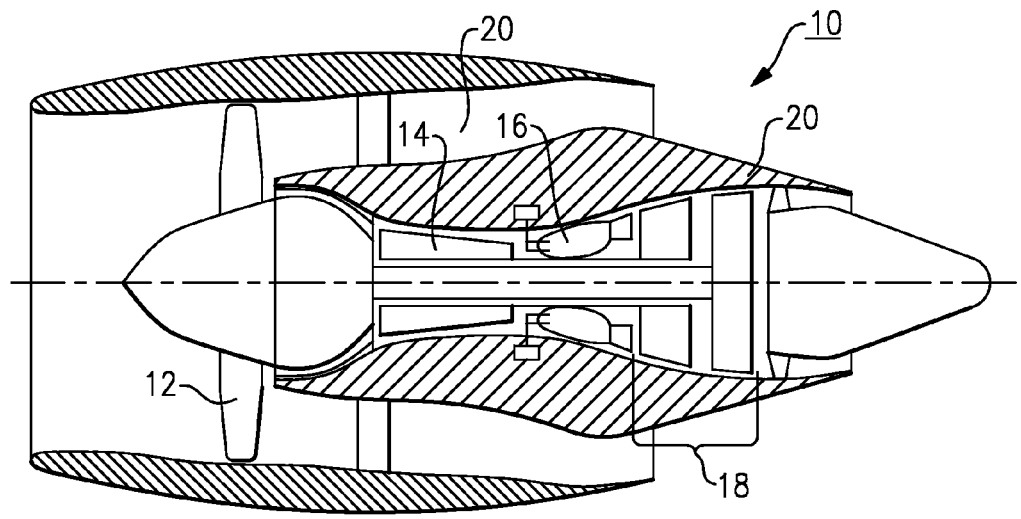
FIG. 1 illustrates a cross-sectional view of a turbine engine.

FIG. 1 illustrates an example of a turbine engine 10, here a turbo fan engine. As other types of turbine engines, such as a turbo jet engine, will likewise benefit from the inventive technique, the term turbine engine is not limited to the disclosed embodiment. As shown, turbine engine 10 has fan 12 through which ambient air is propelled. A multi-stage compressor 14 pressurizes the air and is in communication with the combustor 16 that mixes the compressed air with fuel. The combustor 16 ignites the fuel-air mixture. Expanded gas then passes through the turbine section 18 as shown. Within turbine engine 10 is bypass duct assembly 20. Bypass duct assembly 20 serves to provide additional thrust.

Figure 2:
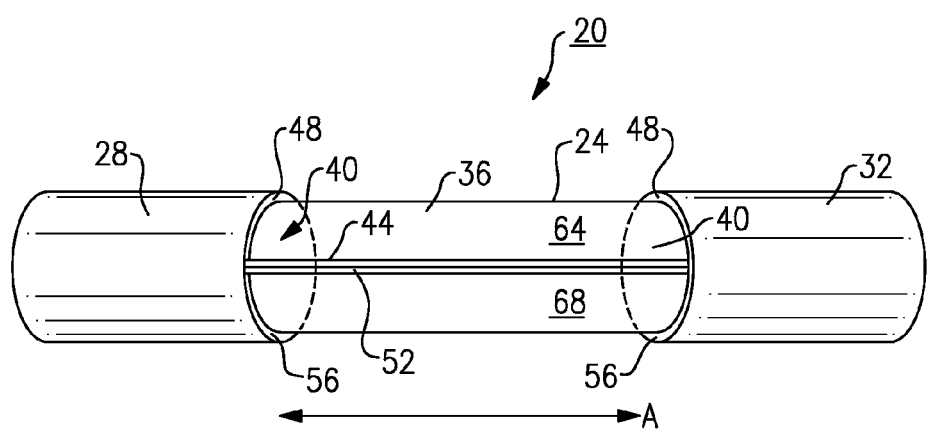
FIG. 2 illustrates a view of a bypass duct assembly for the turbine engine of FIG. 1.

With reference to FIG. 2, a portion of bypass duct assembly 20 has three ducts: intermediate case duct 28, carbon composite duct assembly 24, here a split flange duct, and forward augmenter duct 32. Carbon composite duct assembly 24 extends along axis A. Carbon composite duct assembly 24 has duct body 36 having opening 40 on each end permitting airflow along axis A through duct body 36. Duct body 36 is made of two parts to permit access to the core of turbine engine 10. Duct body 36 has first duct body portion 64 and second duct body portion 68 as shown.

Extending lengthwise or along axis A of first duct body portion 64 is first axial flange 44. Provided around opening 40 is another flange, here first peripheral flange 48, a circumferential flange extending around the circumference of opening 40. Second duct body portion 68 has second axial flange 52 extending along axis A as well as second peripheral flange 56, again a circumferential flange surrounding opening 40. First duct body portion 64 and second duct body portion 68 interface along first axial flange 44 and second axial flange 52. In addition, each half, first duct body portion 64 and second duct body portion 68, also interface in part at first peripheral flange 48 and second peripheral flange 56. First duct body portion 64 and second duct body portion 68 are connected at flanges as known. In addition, carbon composite duct assembly 24 interfaces and connects to intermediate case duct 28 along first peripheral flange 48 and second peripheral flange 56. Forward augmenter 32 interfaces and connects to carbon composite duct assembly 24 through first peripheral flange 48 and second peripheral flange 56 on the other side of carbon composite duct assembly 24.

Figure 3:
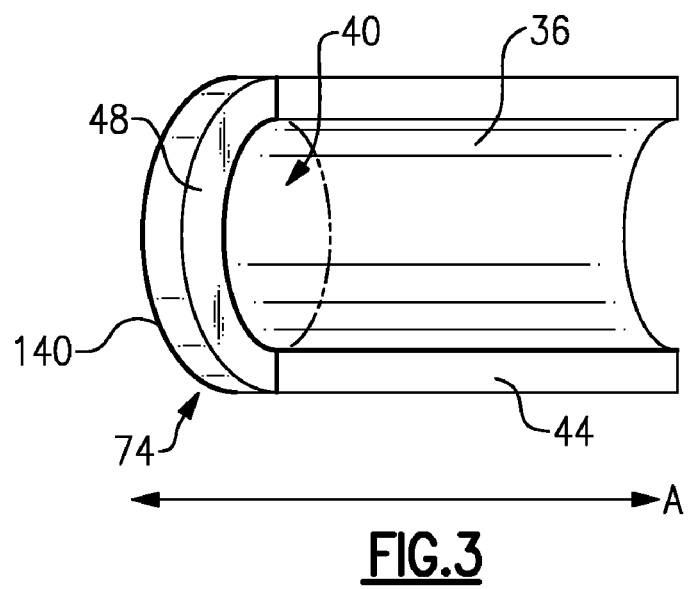
FIG. 3 illustrates a plan view of a portion of the bypass duct assembly of FIG. 2, showing a circumferential flange and an axial flange intersecting to form a corner.
Figure 4:
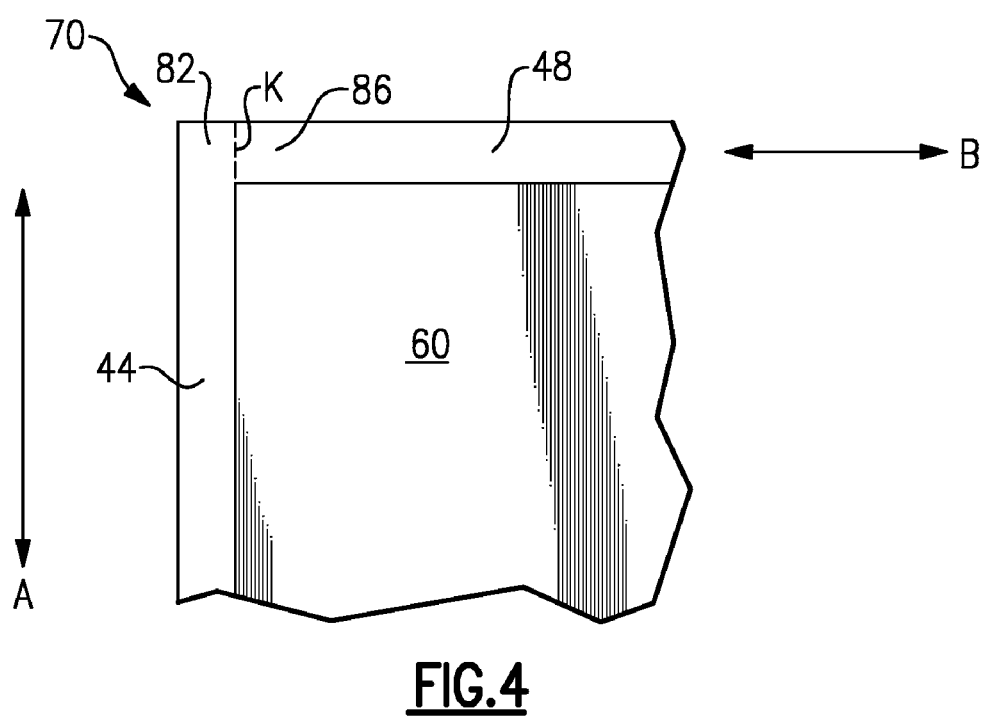
FIG. 4 illustrates a technique for manufacturing the corner of FIG. 3, showing a section of the carbon composite fabric layer.
Figure 5:
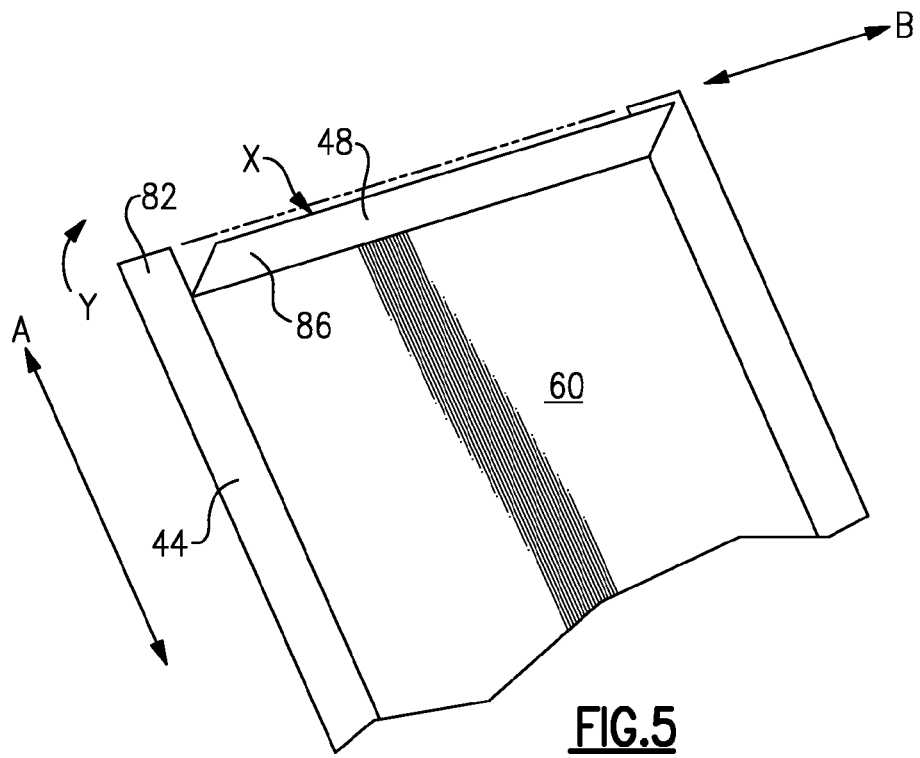
FIG. 5 illustrates the forming of separate portions of the section of FIG. 4.
Figure 6:
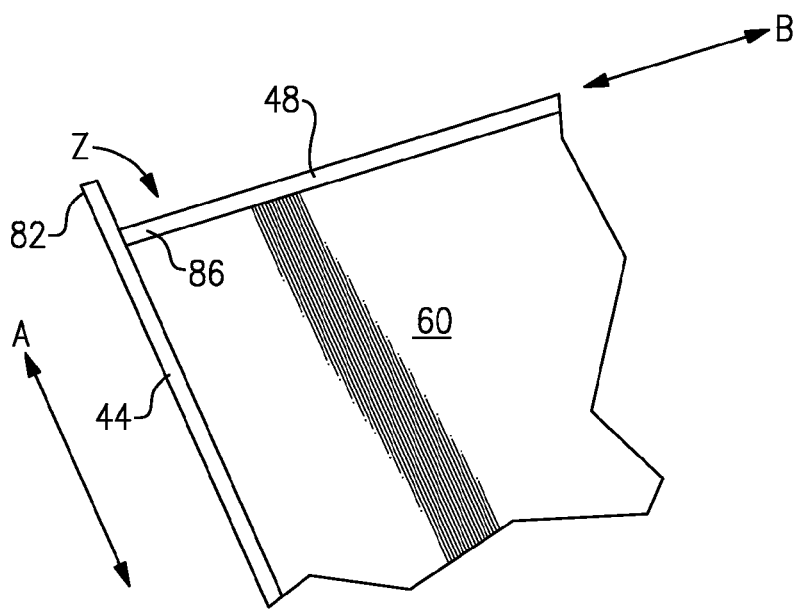
FIG. 6 illustrates the overlapping of each portion of FIG. 5.
Figure 7:
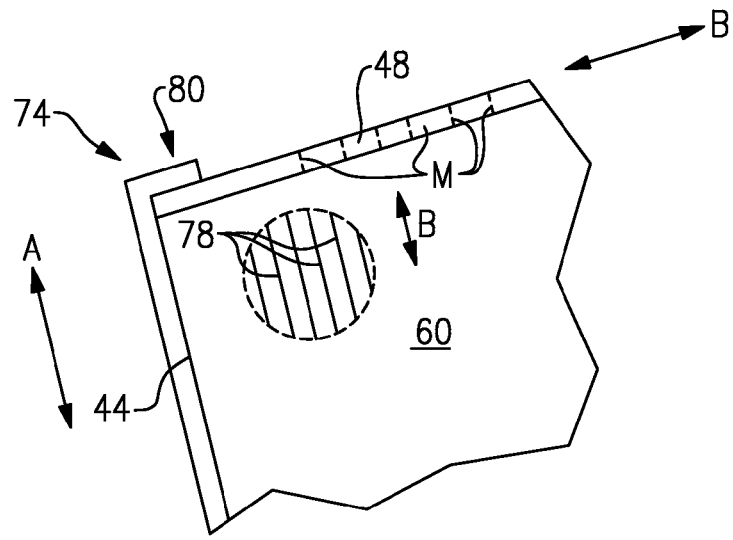
FIG. 7 illustrates the overlapped portions forming a corner.

With reference to FIG. 3 as shown, first axial flange 44 intersects first peripheral flange 48 at first corner 74. Because carbon composite duct assembly 24 is made of carbon composite fabric, there is a difficulty in creating this corner. FIGS. 4-13 illustrate how a corner is manufactured. With reference to FIG. 4, there is provided first carbon composite fabric layer 60, a portion of which will form first peripheral flange 48 while the other portion will form first axial flange 44. First carbon composite fabric layer 60 has first section 70. Along line K, first section 70 is cut creating first portion 82, a tab, and second portion 86, another tab. First portion 82 is now relatively moveable with respect to second portion 86. First portion 82 may rotate about axis A while second portion 86 may rotate about axis B, an axis perpendicular to axis A. Second portion 86 is rotated about axis B in the direction of arrow X to the position shown in FIG. 5. As shown in FIG. 5, first portion 82 may be rotated about axis A in the direction of arrow Y to the position shown in FIG. 6. Then, first portion 82 may then be turned in the direction of arrow Z into second portion 86 forming first overlap 80 as shown in FIG. 7. First portion 82 is adhered to second portion 86 with known adhesives thereby forming first corner 74. As can be seen, first corner 74 is made from first axial flange 44 and first peripheral flange 48. In addition, as shown, first carbon composite fabric layer 60 has first plurality of carbon strands 78, say for example, extending generally along axis A.

Figure 8:
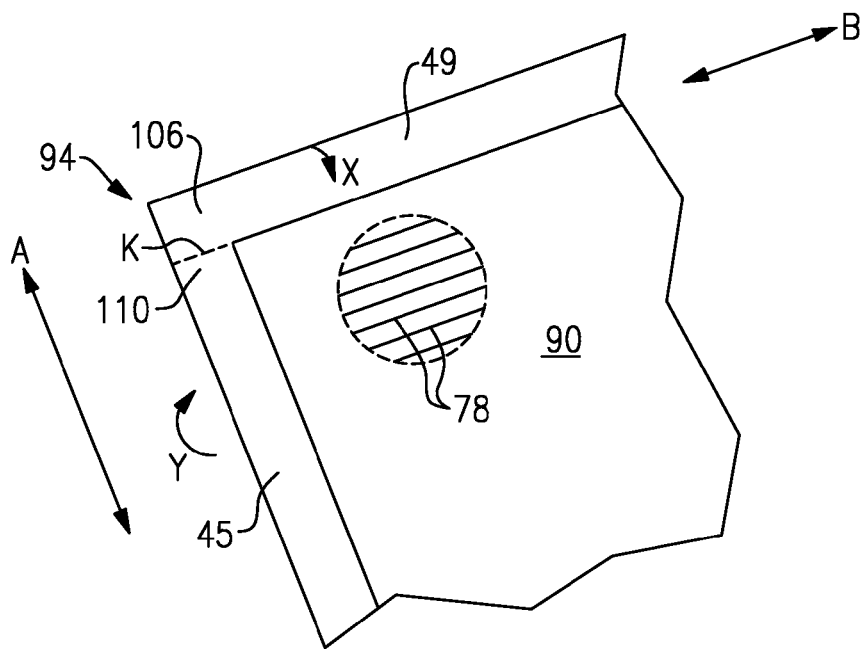
FIG. 8 illustrates a second carbon composite fabric layer.
Figure 9:
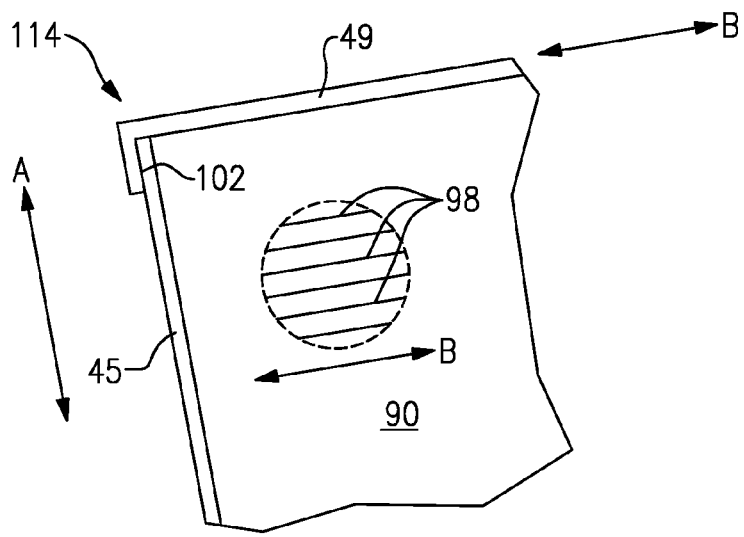
FIG. 9 illustrates a corner created in the second carbon composite fabric layer having a different overlap than the overlap of FIG. 7.

Following formation of first corner 74, other additional layers may be created. With reference to FIG. 8, there is provided second carbon composite fabric layer 90. Second carbon composite fabric layer 90 has first axial flange 45 and first peripheral flange 49. Ultimately, second carbon composite fabric layer 90 will overlap the first carbon composite fabric layer 60 so that first axial flange 44 overlaps with first axial flange 45 and first peripheral flange 48 will overlap with first peripheral flange 49 to form flanges of multiple carbon composite fabric layers. Referring back to FIG. 8, second section 94 of second carbon composite fabric layer 90 is cut along line L thereby creating third portion 106 and fourth portion 110. Similar to the construction of first corner 74, first axial flange 45 may be turned in the direction of arrow Y while first peripheral flange 49 can be turned in the direction of arrow X so that third portion 106 overlaps fourth portion 110 to form second corner 114 as shown in FIG. 9. As further shown in this figure, second carbon composite fabric layer 90 has a second plurality of carbon strands 98, say for example, generally extending along axis B.

Figure 10:
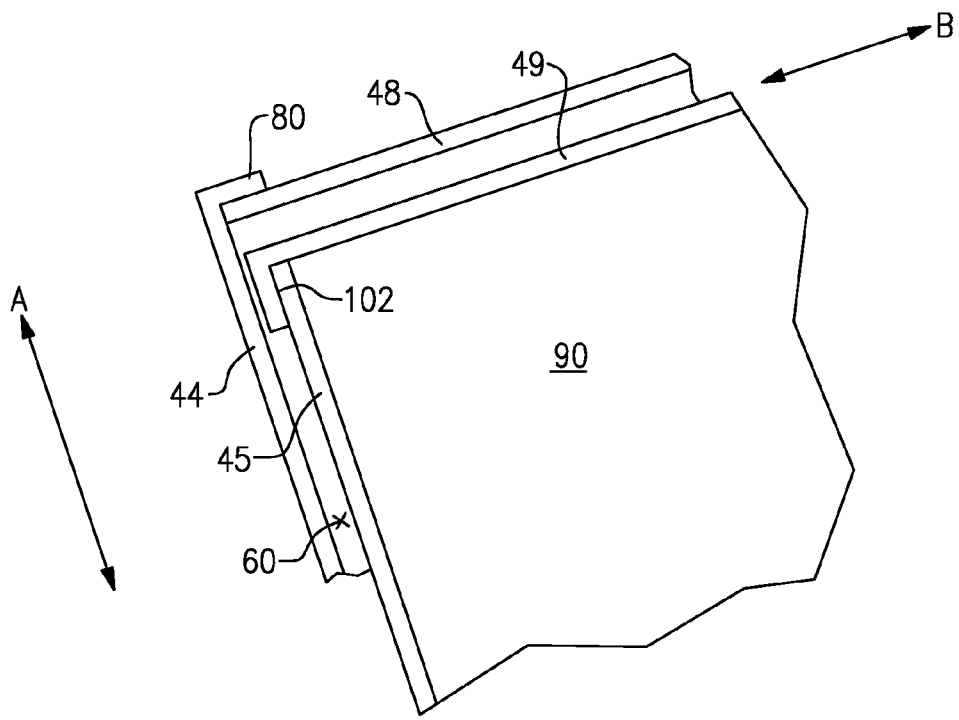
FIG. 10 illustrates the layering of the first carbon composite fabric layer onto the second carbon composite fabric layer.

As shown in FIG. 10, second carbon composite fabric layer 90 is layered over first carbon composite fabric layer 60 such that first plurality of carbon strand 78 of first carbon composite fabric layer 60 are transverse to second plurality of carbon strands 98. In this way, first plurality of carbon strands 78 lays across second plurality of carbon strands 98 to create a stronger duct body 36.

Figure 11:
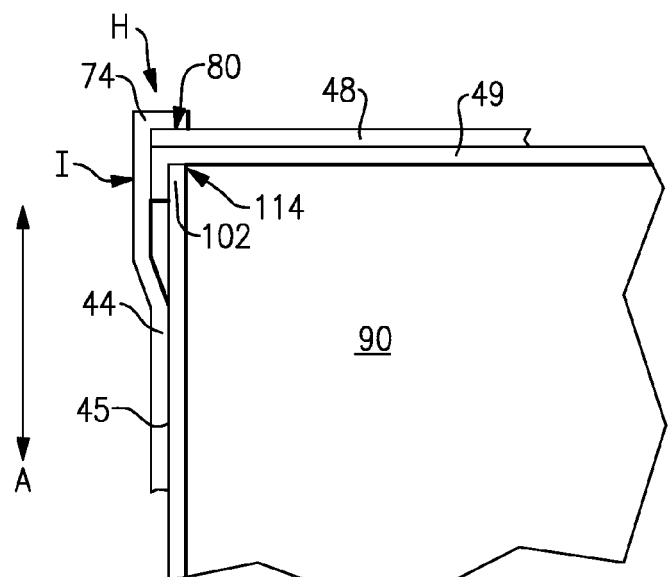
FIG. 11 illustrates the layered first carbon composite fabric layer and a second carbon composite fabric layer.

In addition, first overlap 80 extends along first axis B while second overlap 102 extends along second axis A. By layering second carbon composite fabric layer 90 onto first carbon composite fabric layer 60 in this way, first corner 74 may be layered onto second corner 114 so that first overlap 80 is displaced from second overlap 102 as shown in FIG. 11. By alternating overlaps in this way, the corner of duct body 36 is strengthened. Excess material may be machined off or otherwise removed at locations H and I so that duct body 36 conforms to specification. The layering of each carbon composite fabric layer can occur in the manner described above with alternating overlaps and having carbon strands of each layer intersect each other, thereby producing a resilient duct body 36.

To form duct body 36, the layering of carbon composite fabric layers, such as first carbon composite fabric layer 60 and second carbon composite fabric layer 90, occurs on male mold 120, which is shaped in a semi-cylindrical fashion in the desired shape of duct body 36. To permit first carbon composite fabric layer 60 to lay flat on semi-cylindrical male mold 120, first carbon composite fabric layer 60 is darted, cut, along first peripheral flange 48 along lines M thereby allowing first carbon composite fabric layer 60 to curl over male mold 120. Other layers are likewise darted along peripheral flanges. First carbon composite fabric layer 60 is layered onto male mold 120 followed by second carbon composite fabric layer 90 in the direction of arrow G.

Figure 12:
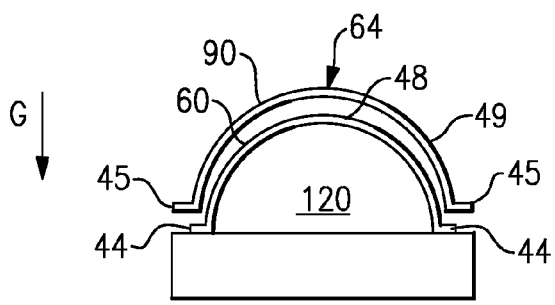
FIG. 12 illustrates a male mold for forming the first carbon composite fabric layer and a second carbon composite fabric layer into one half of the carbon composite duct assembly.
Figure 13:
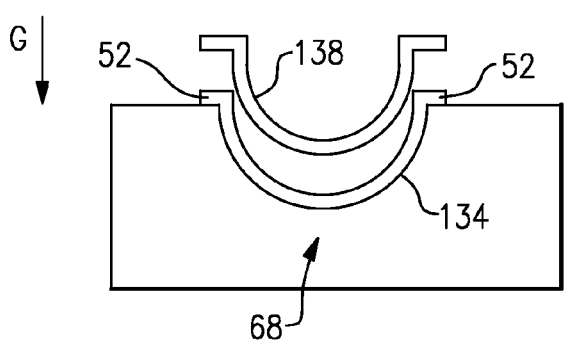
FIG. 13 illustrates a female mold for the formation of the other half of a carbon composite duct assembly.

With reference to FIG. 13, there is shown a female mold 130. Male mold 130 may be used to form second duct body portion 68 in the same manner as first duct body portion 64 as shown in FIG. 12. As shown, layers of carbon composite fabric, such as third carbon composite fabric layer 134 and fourth carbon composite fabric layer 138 are disposed into male mold 130.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A carbon composite duct assembly, comprising:
  a duct body having an opening, said duct body extending along an axis and said opening extending transversely to said axis, wherein said duct body is a turbine engine duct body;
  said duct body having a first carbon composite fabric layer; and
  said duct body having a first axial flange extending from the duct body along said axis and a first peripheral flange radially extending from the duct body along said opening, said first axial flange overlapping said first peripheral flange to form a corner of said first carbon composite fabric layer.

2. The carbon composite duct assembly of claim 1 including a second carbon composite fabric layer disposed on said first carbon composite fabric layer.

3. The carbon composite duct assembly of claim 2 wherein said first carbon composite fabric layer has a first plurality of carbon strands generally extending along a first carbon strand axis and said second carbon composite fabric layer has a second plurality of carbon strands generally extending along a second carbon strand axis wherein said second carbon composite fabric layer is layered onto said first carbon composite fabric layer so that said first carbon strand axis is transverse to said second carbon strand axis.

4. The carbon composite assembly of claim 1 wherein said duct body has a first duct body portion and a second duct body portion, said first duct body portion defining said first axial flange and said second duct body portion defining a second axial flange, said first duct body portion selectively engageable to said second duct body portion along said first axial flange and said second axial flange.

5. The carbon composite assembly of claim 4 wherein said second duct body portion has a second peripheral flange extending along said opening, said first peripheral flange selectively engageable to said second peripheral flange.

6. The carbon composite assembly of claim 1 wherein said duct body comprises at least a portion of a bypass duct for a turbine engine.

7. The carbon composite assembly of claim 6 including an intermediate case duct in communication with said duct body.

8. The carbon composite assembly of claim 6 including a forward augmenter duct in communication with said duct body.

9. A carbon composite duct assembly, comprising:

a duct body having an opening, said duct body extending along an axis and said opening extending transversely to said axis;

said duct body having a first carbon composite fabric layer;

said duct body having a first axial flange extending along said axis and a first peripheral flange extending along said opening, said first axial flange and said first peripheral flange overlapping to form a corner of said first carbon composite fabric layer, said duct body comprising at least a portion of a bypass duct for a turbine engine; and said duct body having a first duct body portion and a second duct body portion, said first duct body portion defining said first axial flange and said second duct body portion defining a second axial flange, said first duct body portion selectively engageable to said second duct body portion along said first axial flange and said second axial flange, wherein said second duct body portion has a second peripheral flange extending along said opening, said first peripheral flange selectively engageable to said second peripheral flange.

10. The carbon composite duct assembly of claim 9 including a second carbon composite fabric layer disposed on said first carbon composite fabric layer.

11. The carbon composite duct assembly of claim 10 wherein said first carbon composite fabric layer has a first plurality of carbon strands generally extending along a first carbon strand axis and said second carbon composite fabric layer has a second plurality of carbon strands generally extending along a second carbon strand axis wherein said second carbon composite fabric layer is layered onto said first carbon composite fabric layer so that said first carbon strand axis is transverse to said second carbon strand axis.

12. The carbon composite duct assembly of claim 1 wherein said first carbon composite fabric layer includes a first section having a first portion and a second portion that overlap to form said corner.

13. The carbon composite duct assembly of claim 12 comprising a second carbon composite fabric layer having a second section including a third portion and a fourth portion that overlap to form a second corner, wherein said second corner overlaps said corner of said first carbon composite fabric layer.

* * * * *